(12) United States Patent
Blakborn et al.

(10) Patent No.: US 11,588,282 B2
(45) Date of Patent: Feb. 21, 2023

(54) ELECTRICAL PLUG CONNECTOR, HIGH-VOLTAGE WIRING HARNESS, HIGH-VOLTAGE SYSTEM AND METHOD FOR ATTACHING AN ELECTRICAL PLUG CONNECTOR

(71) Applicant: Rosenberger Hochfrequenztechnik GmbH & Co. KG, Fridolfing (DE)

(72) Inventors: Willem Blakborn, Inzell (DE); Thomas Garten, Dresden (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 64 days.

(21) Appl. No.: 17/269,201

(22) PCT Filed: Aug. 29, 2019

(86) PCT No.: PCT/EP2019/073149
§ 371 (c)(1),
(2) Date: Feb. 17, 2021

(87) PCT Pub. No.: WO2020/048871
PCT Pub. Date: Mar. 12, 2020

(65) Prior Publication Data
US 2021/0226390 A1 Jul. 22, 2021

(30) Foreign Application Priority Data

Sep. 3, 2018 (DE) .................... 10 2018 121 400.6

(51) Int. Cl.
*H01R 13/74* (2006.01)
*H01R 13/645* (2006.01)
(Continued)

(52) U.S. Cl.
CPC ....... *H01R 13/748* (2013.01); *H01R 13/6456* (2013.01); *H01R 13/6581* (2013.01);
(Continued)

(58) Field of Classification Search
CPC ............ H01R 2201/26; H01R 13/6456; H01R 13/6581; H01R 13/743; H01R 13/748; H01R 13/5202
See application file for complete search history.

(56) References Cited

U.S. PATENT DOCUMENTS 3,951,500 A * 4/1976 Anderson ............ H01R 13/631
439/248
7,462,067 B1 12/2008 Whiteman, Jr.
(Continued)

FOREIGN PATENT DOCUMENTS

JP 2002270294 A1 9/2002

OTHER PUBLICATIONS

German Search Report dated Jul. 17, 2019.
Miscellaneous PCT/EP2019/073149 Documents.

*Primary Examiner* — Oscar C Jimenez
(74) *Attorney, Agent, or Firm* — Randall Danskin P.S.

(57) ABSTRACT

An electrical plug connector, in particular an electrical pin connector socket for the power electronics in the automotive sector, comprising a plug connector body for receiving a contact device and comprising a shield. The plug connector body is designed for introducing into an opening of a housing part of a housing of an electronics unit. The plug connector body is designed in multiple parts and has at least one inner plug connector body and an outer plug connector body, which are positioned on opposite sides of the housing part. The inner plug connector part can be fixed in the housing of the electronics unit independently of the housing part. Securing means connect the plug connector bodies to one another so that the housing part is fixed between the plug connector bodies.

20 Claims, 6 Drawing Sheets

(51) Int. Cl.
*H01R 13/6581* (2011.01)
*H01R 13/52* (2006.01)

(52) U.S. Cl.
CPC ....... *H01R 13/743* (2013.01); *H01R 13/5202* (2013.01); *H01R 2201/26* (2013.01)

(56) References Cited

U.S. PATENT DOCUMENTS

| | | | |
|---|---|---|---|
| 8,925,189 B2* | 1/2015 | Margrave | H01R 13/6581 |
| | | | 439/597 |
| 9,640,920 B2* | 5/2017 | Hanaoka | H01R 13/6683 |
| 9,923,311 B2 | 3/2018 | Blakborn | |
| 2002/0155756 A1* | 10/2002 | Yoshioka | H01R 13/648 |
| | | | 439/607.01 |
| 2011/0189888 A1 | 8/2011 | Rhein | |
| 2020/0319413 A1* | 10/2020 | Katagiyama | H01R 13/6582 |

* cited by examiner

ELECTRICAL PLUG CONNECTOR, HIGH-VOLTAGE WIRING HARNESS, HIGH-VOLTAGE SYSTEM AND METHOD FOR ATTACHING AN ELECTRICAL PLUG CONNECTOR

RELATED APPLICATIONS

This US National Phase Utility Patent Application claims priority to German Patent Application No. 10 2018 121 400.6 which was filed on 3 Sep. 2018, and also claims priority to PCT Patent Application No. PCT/EP2019/073149 which was filed on 29 Aug. 2019 and which was published as WO 2020/048871 A1 on 12 Mar. 2020. The entire contents of the aforementioned German Patent Application, the aforementioned PCT Patent Application and the aforementioned PCT Publication are all expressly and fully incorporated herein by this reference. This claim of priority is also being made in, and is set forth in, the Application Data Sheet (ADS) filed contemporaneously herewith.

BACKGROUND

The present invention relates to an electrical plug connector, high-voltage wiring harness, high-voltage system and method for attaching an electrical plug connector.

The invention relates to an electrical plug connector, in particular an electrical multi-pin connector for the electronic power system in the automotive industry.

The invention also relates to a high voltage cable harness comprising an electrical plug connector.

In addition, the invention relates to a high voltage system, in particular for a motor vehicle, comprising an electrical plug connector.

Moreover, the invention relates to a method for attaching an electrical plug connector to a housing part of a housing of an electronic unit, in particular a high voltage battery.

Numerous electrical plug connectors, in particular electrical multi-pin connectors, are known in electronics technology. It is known to use the electrical plug connectors to transmit electrical energy and/or signals with a largest possible band width, in particular to transmit to corresponding mating plug connectors.

Electrical plug connectors comprise contact devices in a variety of embodiments.

Pin contacts are in particular commonplace. Irrespective of the specific type, the different plug connectors are referred to below as electrical plug connectors.

In the case of an electrical plug connector, or an electrical mating plug connector, this can be a plug-in connector, a mounting plug, socket, coupling or an adaptor. The term used within the scope of the invention "plug connector" or "mating plug connector" is representative for all variants.

High demands with regard to their robustness and the reliability of the plug connections are placed in particular on plug connectors for the automotive industry. Thus, a plug connection must be able to withstand high loads for example mechanical loads and also remain closed in a defined manner. It must be ensured that the electrical connection is not unintentionally separated for example during operation of a vehicle. Moreover, the plug connectors must also ensure a faultless transmission of electrical energy, signals and/or data even in contaminated, moist and/or chemically aggressive environments.

It is a priority to ensure safety and reliability particularly in the case of an autonomous operation of vehicles and for assist systems.

Electrical plug connectors, or their plug connector bodies, can be installed on an electrical conductor, a cable harness, a cable or an electrical device such as for example a housing or an electronic or electrical unit.

Special demands are placed on electrical plug connectors in particular also in the high voltage industry. High voltage plug connectors are used in the automotive industry, above all in the case of electric and/or hybrid vehicles, in order to supply a high voltage battery with a charging current or to draw off the stored energy from the battery. Thus, for example for high voltage connections, suitable plug connectors for supply units, such as for example a charging box in a garage or a carport or also in the case of current charging stations, are used in order to supply a high voltage battery of a vehicle with a charging current. In this case, the electrical plug connector must permanently and reliably prevent the penetration of moisture and contaminates and must ensure a faultless transmission of the electrical charging current and where appropriate of other electrical or electronic signals for controlling the charging procedure of the high voltage battery.

Specifically designed electrical high voltage plug connectors are required for the use of electrical plug connectors in order to transmit a comparatively large electrical drive energy (or also braking energy) in the case of electric and/or hybrid vehicles. It is moreover to be taken into consideration that electromagnetic interference signals that are generated by eddy currents and/or switching edges with high D.C. voltages can cause interference in the electronics system in an electronic controller, for example within a motor vehicle. An efficient electromagnetic shield, in particular of the electrical plug connectors. which are used in the high voltage range in motor vehicles, is therefore of advantage in order to avoid controlled units within the vehicle being subjected to interference. Therefore, correspondingly high demands are placed on the shield of the electrical plug connectors.

The electrical plug connectors known from the prior art generally comprise an electromagnetic shield that can be contacted in an electrical manner by a mating plug connector.

It is known from the prior art to screw a plug connector body of an electrical plug connector, which receives a contact device, for example having pin contacts, to a housing part of a housing of an electronic unit, for example of a housing of a high voltage battery. The housing in this case is generally embodied from sheet metal or a cast part. The plug connector body is then screwed directly to the sheet metal in such a manner that a front end of the plug connector body protrudes outward through an opening of the housing part with the result that an electrical mating plug connector can be placed on the front end of the plug connector body. In this case, care is to be taken that the plug connector body of the plug connector is correctly mounted on the housing part so that in particular also the electrical mating plug connector can be connected correctly to the electrical plug connector.

It has proven in practice that the procedure of correctly mounting the plug connector body is complex.

An object of the present invention is to improve the electrical plug connectors known from the prior art, in particular to simplify the procedure of mounting such electrical plug connectors on a housing part of a housing of an electronic unit and to a great extent avoid such electrical plug connectors being incorrectly mounted.

Moreover, an object of the present invention is to provide an advantageous high voltage cable harness.

Furthermore, an object of the present invention is to provide a high voltage system, in particular for a motor vehicle, which renders it possible to perform the mounting procedure in a simple and reliable manner.

In addition, an object of the present invention is to provide an advantageous method that is simple and reliable for attaching an electrical plug connector to a housing part of a housing of an electronic unit, in particular of a high voltage battery.

The electrical plug connector, in accordance with the inventions comprises a plug connector body for receiving a contact device. Moreover, a shield is provided in particular in order to shield electromagnetic interference signals. The plug connector body is embodied so as to be inserted into an opening of the housing part of a housing and electronic unit.

The electrical plug connector is preferably an electrical multi-pin connector. Electrical multi-pin connectors are known inter alia in the automotive industry.

The electrical plug connector is provided in particular for the electronic power system in the automotive industry. However, the invention is not limited thereto. Fundamentally the electrical plug connector in accordance with the invention can be used advantageously within the entire field of electrical engineering or in the entire field of electronic engineering.

The electronic unit is preferably a high voltage electronic unit, in particular a high voltage battery.

It is provided in accordance with the invention that the plug connector body is embodied in multiple parts and comprises at least one inner plug connector body and an outer plug connector body that are positioned on opposite-lying sides of the housing part. The inner plug connector body can be fixed in the housing of the electronic unit independently from the housing part. Moreover, attachment means are provided in order to connect the plug connector bodies to one another in such a manner that the housing part is fixed between the plug connector bodies.

Fundamentally it is also provided that the inner plug connector body, in addition to being attached to the housing part, is also attached to at least one further section of the housing.

The solution in accordance with the invention renders it possible to connect the plug connector body in a simple and reliable manner to the housing part of the housing of the electronic unit. It is consequently realised in a simple manner that the electrical plug connector body is positioned in a defined manner such that an electrical mating plug connector can be connected in a reliable and safe manner to the electrical plug connector.

The inner plug connector body can be attached in the housing in an arbitrary manner, preferably by means of a screw connection or corresponding screw sites.

It is advantageous if the inner plug connector body is initially fixed in the housing of the electronic unit and then the housing part that is preferably embodied as a cover is placed thereon.

In this case, the inner plug connector body and the housing part that is provided with the opening are positioned in such a manner with respect to one another that the housing part, which is embodied in particular as a cover, can be placed in a suitable manner on the housing so that the inner plug connector body protrudes outward from an inner chamber of the housing. Subsequently, the outer plug connector body is placed on the outer face of the housing part in such a manner that the inner plug connector body can be connected to the outer plug connector body with the aid of the attachment means, whereby the housing part which is located between the two plug connector bodies is also fixed in place.

It is preferred that the attachment means is embodied so as to be releasable.

It is preferred that the attachment means are embodied separately from the outer plug connector body. The outer plug connector itself is consequently not an attachment means within the scope of the invention, in particular it is not a union nut.

In a particularly advantageous configuration it is provided that the attachment means are embodied as screw connections.

It can be provided in accordance with the invention that one of the plug connector bodies comprises at least two, preferably four, sockets, preferably threaded sockets, which are arranged in a symmetrical manner around a central axis of the plug connector and the corresponding plug connector body comprises two, preferably four, through-going holes that are arranged in a symmetrical manner around the central axis of the plug connector, wherein the attachment means are embodied as connection elements, preferably embodied as threaded bolts, in order to connect the plug connector bodies to one another.

In the case of this configuration, it is preferably also provided that the housing part comprises holes that are accordingly aligned with the sockets or with the through-going holes and the connection elements can be inserted through said holes in order to connect the plug connector bodies to one another, preferably by means of a screw connection.

This configuration renders it possible to connect the plug connector bodies to one another in a reliable manner in particular by means of a screw connection and to fix them to the housing part.

In a particularly advantageous manner, the electrical plug connector is not only particularly reliably fixed in place as a result of this configuration but rather it can also be released as required.

It is preferred that the inner plug connector body comprises the sockets, in particular threaded sockets, and the outer plug connector comprises the through-going holes for the attachment means.

Moreover, it is provided in accordance with the invention that the shield comprises a cylindrical section and multiple shield tabs that adjoin the cylindrical section. In this case, the shield can be arranged and embodied in such a manner that it surrounds the contact device preferably in a coaxial manner.

It is preferred that the shield is arranged in a symmetrical and concentric manner around the central axis of the plug connector.

It is further preferred that the shield is connected to the inner plug connector body or represents a component of the inner plug connector body.

Moreover, the shield can be embodied in such a manner that the shield tabs that adjoin the cylindrical section of the shield are suitable for connecting to an electrical mating plug connector with the result that if the electrical plug connector is plugged together with the mating plug connector a continuous shielding arrangement is provided.

It is preferred that four to twenty-four, it is further preferred six to eighteen and it is more particularly preferred nine to fifteen, and most particularly preferred twelve, shield tabs are provided distributed uniformly around the central axis of the plug connector. It can be provided that the shield tabs are embodied in a resilient manner, in particular in the radial direction, in order to produce a reliable connection to the shield of the electrical mating plug connector.

It can be of advantage if the shield tabs comprise radially protruding contact sites that are positioned in such a manner that the radially protruding contact sites make contact with the housing part in the region of the opening.

It is preferred that the radially protruding contact sites contact the housing within the opening or on an inner wall of the opening.

The radially protruding contact sites improve the electrical connection between the shield and the housing part and consequently also between the shield and the entire housing of the electronic unit.

The housing part and/or the housing of the electronic unit can be embodied preferably from metal, in particular from sheet metal. The housing part and/or the housing can however for example also be embodied as a cast part or cast housing.

Fundamentally, the outer plug connector bodies can also comprise a shield.

The shield can be used in particular for protecting the environment of the electrical plug connector from the electromagnetic fields that are output by the electrical plug connection. The shield can be used so as to improve the electromagnetic compatibility and in addition to ensure the interference-free signal transmission and processing of further electronic components, in particular also of the control units, which are installed in particular in a motor vehicle. Particularly if the plug connector in accordance with the invention is used for transmitting high frequency signals, it is however also possible for the shield to contribute to shielding the signal transmission by means of the plug connector from external interference sources in order to improve the transmission.

It is possible in accordance with the invention to provide that the contact device is received in the inner plug connector body, preferably connected in a positive-locking manner to the plug connector body, in particular clipped therein.

However, it is fundamentally possible for the contact device to be connected to the inner plug connector body in an arbitrary manner, for example also in a non-positive-locking manner and/or positive-locking manner. A positive-locking connection has however proven to be especially suitable particularly in the automotive industry.

A positive-locking connection of the contact device to the inner plug connector body can preferably be provided by virtue of the fact that the inner plug connector body comprises latching hooks, which latch into suitable mating elements of the contact device in such a manner that the contact device that is inserted into the inner plug connector body can no longer be drawn out in the opposite direction to the direction of insertion. For this purpose, the contact device can comprise shoulders, steps or protrusions that correspond accordingly with the latching hooks. It can be of particular advantage if the shoulders, steps or protrusions, with which the latching hooks correspond, are embodied on the current connections of the plug connector body since these have a correspondingly high degree of stability.

Naturally, other configurations are also possible here, in particular it is possible to also provide that the contact device comprises latching hooks and the inner plug connector body comprises accordingly corresponding mating elements.

It can be provided in accordance with the invention that the contact device comprises at least one, preferably two or four or more inner conductor parts that are preferably embodied as pin contacts. However, it is fundamentally possible for the contact device to comprise an arbitrary construction in order to transmit electrical energy or signals at any frequencies and at arbitrary data rates, preferably with a largest possible band width.

The solution in accordance with the invention is suitable in a particular manner for transmitting electrical current, for example for charging a battery. For this purpose, it is provided that the inner conductor parts are used to supply the current. It can be provided that in the case of a configuration having two inner conductor parts one inner conductor part lies against the electrical negative terminal or the earth and the other inner conductor part lies against an electrical positive terminal of the supply voltage. In the case of a configuration having four inner conductor parts, it is possible preferably to provide that the inner conductor parts are each positioned in pairs in such a manner that one pair of inner conductor parts is connected to the electrical negative terminal and one pair of inner conductor parts is connected to the electrical positive terminal of the supply voltage in such a manner that in each case one inner conductor part of a corresponding mating plug connector can be inserted in each case between a pair of inner conductor parts of the electrical plug connector. This produces a particularly reliable transmission of the currents.

It is fundamentally also possible to provide that the contact device is embodied in a bipolar or multipolar manner or that the contact device is divided into multiple part contact devices.

The inner conductor parts of the contact device can preferably be embodied for transmitting a high voltage and consequently can be embodied as high voltage inner conductor parts. The voltage that is provided for transmission can be for example 220 Volt, preferably 400 Volt, but also higher, for example also 110 to 1000 Volt, preferable 400 to 1000 Volt.

The contact device is preferably provided as a contact device for transmitting currents in electric and/or hybrid vehicles, in particular for providing the drive power and/or for charging the battery, in particular of a high voltage battery by virtue of using the braking energy (recuperation) or by means of external current sources.

It can be of advantage if the contact device is embodied as a high voltage contact device and the inner conductor parts are embodied as high voltage inner conductor parts.

Moreover, it is of advantage if the contact device comprises an HV-interlock for monitoring that the plug connector is correctly connected to an electrical mating plug connector.

The HV-interlock is preferably embodied so as to monitor that the electrical plug connector is correctly connected to the mating plug connector in the high voltage current circuit with the aim of preventing an electrical hazard due to unintentional, improper or any other variations of separation of the current circuit of an electronic power system in particular of a high voltage system in the automotive industry. In order to realise this the electronic power system can preferably comprise a safety circuit. In this case, this can be a current circuit to which is applied for example a 12 Volt on-board voltage and which runs from the electrical plug connected to the electrical mating plug connector. If the current circuit of the safety circuit is interrupted due to one of the plug connections being pulled apart, then this is recognized by a control unit. The control unit can then open a high voltage main relay or the like and disconnect the electronic power system, in particular the high voltage system. The fundamental construction of an HV-interlock for monitoring the correct plug connection is known.

Moreover, it is provided in accordance with the invention that the plug connector bodies of the electrical plug connector comprise a positioning device such that the plug connector bodies (in other words the inner plug connector body and the outer plug connector body) can only be connected to one another in a defined orientation.

It is preferred that the positioning device is embodied in such a manner that the plug connector bodies can only be connected to one another in precisely a specific orientation. However, it is fundamentally conceivable to also configure the positioning device in such a manner that the plug connector bodies can be connected to one another in two or also more defined orientations. It is however of advantage, particularly for realizing an electrical plug connection for the electronic power system in the automotive industry or electronics industry, to configure the positioning device in such a manner that the two plug connector bodies of the plug connector can only be connected to one another in precisely one specific orientation.

The positioning device can be configured in such a manner that one of the plug connector bodies comprises one or multiple positioning lugs or corresponding protrusions and the other plug connector body comprises accordingly correspondingly arranged positioning grooves, springs and or recesses. In this case, the plug connector bodies can preferably be configured in such a manner that they can only be connected to one another if the positioning device is appropriately oriented, in particular in such a manner that the positioning lugs of one plug connector body are aligned with the positioning groves of the other plug connector body. It is preferred that the plug connector bodies are connected to one another due to a movement that runs parallel to the central axis of the electrical plug connector. The plug connector bodies are preferably plugged one onto the other.

It has proven to be particularly suitable if the plug connector bodies comprise one, two, three, four or even more pairs of positioning lugs/positioning grooves which are arranged in such a manner that the plug connector bodies can be connected to one another preferably only in specifically one orientation. It is thereby realized that the plug connector bodies can only be connected to one another in the predetermined orientation and the connection is accordingly performed in a reliable manner and by means of the positioning device.

The positioning grooves or the positioning lugs can each be embodied on one of the plug connector bodies. The other plug connector body is then configured accordingly in a corresponding manner. However, combinations are also possible, in other words that both plug connector bodies comprise both positioning grooves and also positioning lugs.

In one development of the invention, it has been shown that it can be of advantage if the inner plug connector body comprises one or multiple positioning grooves and the outer plug connector or body comprises corresponding positioning lugs. The positioning grooves in the inner plug connector body preferably run in the axial direction and preferably in such a manner that they run between two shield tabs. It is preferred that one, two, three, four or multiple positioning grooves are provided that run in each case between two shield tabs.

It can be of advantage if the plug connector having an electrical mating plug connector a coding device is embodied in such a manner that the plug connector and the mating plug connector can only be connected in a defined orientation.

It is preferred that the coding device is embodied as a mechanical coding device. However, fundamentally a magnetic coding device or a combination thereof is also possible. In this case, it is also possible to provide a crude mechanical guidance and a fine magnetic guidance in order to connect the electrical plug connector to the electrical mating plug connector in a particularly comfortable and reliable manner.

It is preferred that the part of the coding device that is allocated to the electrical plug connector is embodied at a suitable site on the outer plug connector body, preferably on an axial end of the outer plug connector body that is remote from the inner plug connector body. The electrical mating plug connector is preferably embodied accordingly in a corresponding manner. The coding device can comprise one, two, three or more pairs of coding elements/coding mating elements which must be oriented accordingly in a corresponding manner so that electrical mating plug connector can be connected to the electrical plug connector.

It is preferred that the coding device is configured in such a manner that the electrical plug connector on the electrical mating plug connector can only be connected to one another in precisely one orientation. However, it is fundamentally also possible that the coding device renders it possible to provide a connection in two, three, four or more, defined orientations.

However, if the electrical plug connector and the electrical mating plug connector are used for the electronic power system in the automotive industry and/or electronics industry, it is suitable in a particular manner if the electrical plug connector can be connected to the electrical mating plug connector in precisely one orientation or in a maximum two orientations.

It can be provided in accordance with the invention that the plug connector comprises a guide that is embodied in a part annular manner and is embodied in order to render it possible to provide a particularly robust connection of the plug connector to a mating plug connector that comprises a 45° dismount facility to a 135° dismount facility, preferably a 90° dismount facility.

A reliable and robust contact between the electrical plug connector and the mating plug connector is of particular importance particularly in the case of plug connections that are used in the electronic power system in the automotive industry. It has proven to be particularly suitable if the guide is embodied in particular as a guide ring on the electrical plug connector in order to attach the electrical mating plug connector in a reliable manner.

The guide can preferably be embodied on the outer plug connector body. Insofar as the mating plug connector comprises a dismount facility that runs parallel to the longitudinal axis of the electrical plug connector or to the direction of the plug-in direction, the electrical plug connector can also comprise a guide that is embodied in a closed, annular manner.

In one advantageous development of the invention, it is possible to provide that the electrical plug connection comprises a toothing arrangement that is provided so as to connect with a corresponding toothing arrangement of the mating plug connector. In this case, the toothing arrangement can be embodied as a toothed ring, as a part ring or by means of multiple annular segments. If the toothing arrangement is embodied as annular segments, it is possible to provide multiple annular segments that cooperate with accordingly corresponding annular segments of the electrical mating plug connector in order to realize a preferably positive-locking toothing arrangement in such a manner that the toothing arrangement prevents the electrical mating plug connector rotating on the electrical plug connector.

It is preferred that the contact device comprises two current connections that supply the inner conductor parts accordingly with current (for example positive/negative connections or phase/neutral conductors). In this case, it can be preferably provided that each of the two current connections is connected to an inner conductor part or to a pair of inner conductor parts between which a corresponding inner conductor part of an electrical mating plug connector can then be inserted.

It can be provided that the current connections comprise a different length, in other words spaced at a different distance from the inner plug connector body in the axial direction with the result that the current cable can be connected in a simple manner. The current connections can preferably comprise in each case a hole for connecting a current cable, wherein the current cable leads preferably to a battery, in particular a high voltage battery, in particular of a motor vehicle.

It can be of advantage if the sockets, preferably the threaded sockets of one of the plug connector bodies and/or the through-going holes of the other plug connector body are provided with a seal, preferably an O-ring that adjoins the hole in the housing part. As a consequence, in particular for the automotive industry, an important sealing arrangement is realized that safeguards use in a moist, contaminated and/or possibly chemically aggressive environment.

It is preferred that seals, in particular O-rings, are only provided on the sockets, in particular on the threaded sockets, which are preferably realized on the inner mating plug connector body.

Moreover, it can be of advantage if there is provided on the inner face and/or on the outer face of the housing part a seal, in particular a sealing ring, which seals the opening in the housing part with respect to the adjoining plug connector body. The adjoining plug connector body and/or the housing part can if appropriate comprise for this purpose a depression into which the seal, in particular the sealing ring, is placed at least in part. The seal, in particular the sealing ring, is preferably provided between the housing part and the outer plug connector body. As a consequence, the opening in the housing is reliably sealed with respect to a possibly contaminated, moist or chemically aggressive environment.

The electrical plug connector in accordance with the invention is embodied in particular as a two-part multi-pin connector for attaching to a housing, in particular to a sheet metal housing.

The plug connector, in particular the contact device, comprises preferably an essentially round cross-section. It is preferred that the electrical plug connector is constructed with a cross-section that is to a great extent or essentially symmetrical insofar as the functions render this possible. However, different cross-sections, in particular square cross-sections or rectangular cross-sections, are also possible.

The invention also relates to a high voltage cable harness comprising an electrical plug connector in accordance with above embodiments and a pre-fabricated cable having a corresponding electrical mating plug connector.

The invention relates moreover to a high voltage system, in particular for a motor vehicle, comprising an electrical plug connector, a housing of a high voltage electronic unit, in particular of a high voltage battery, having a housing part to which the electrical plug connector is fixed and having an electrical mating plug connector for connecting to the electrical plug connector.

Furthermore, the invention relates to a method for attaching an electrical plug connector to a housing part of a housing of an electronic unit, in particular of a high voltage battery. wherein a contact device, that is provided with a shield is inserted into an inner plug connector body of the plug connector, following which the inner plug connector body is positioned and fixed in the housing in such a manner that a housing part of the housing that is provided with an opening can be placed on the inner plug connector body in such a manner that a front part of the inner plug connector body penetrates the opening in the housing part outward from the inner chamber of the housing, wherein the housing part is embodied as a cover of the housing and following this an outer plug connector body that corresponds to the inner plug connector body is placed on an outer face of the housing part and screwed to the inner plug connector body in such a manner that the housing part is fixed between the two plug connector bodies.

The method in accordance with the invention renders it possible to mount the electrical plug connector in a particularly simple manner and a robust and reliable connection to a housing part of a housing of an electronic unit is produced.

The inventors have recognized that it is of advantage if initially an inner plug connector body that is provided with the contact device is fixed in the housing and the housing part which is preferably the cover of the housing is subsequently placed on. The cover of the housing is placed on in such a manner that an opening that is provided in the cover is placed on the inner plug connector body.

It is preferred that this is performed in such a manner that a shield of the plug connector body produces an electrical connection to the cover. The shield is preferably configured as has been already described above or as will be described below, in particular contact sites can be provided.

Subsequently, the outer plug connector body can then be placed on the outside on the cover and fixed to the inner plug connector body using attachment means. As a consequence, the cover that is located between the inner plug connector body and the outer plug connector body is fixed in place. The method in accordance with the invention renders it possible to mount the plug connector body in a reliable and robust manner. Such a method is suitable for electrical plug connectors for the electronic power system in the automotive industry, in particular for a high voltage cable harness and quite particularly preferred for a high voltage system of a motor vehicle.

Features that have already been described in the context of the electrical plug connector in accordance with the invention can naturally also be advantageously workable for the high voltage cable harness, the high voltage system and the method in accordance with the invention—and conversely. Moreover, advantages that have already been mentioned in the context of the electrical plug connector in accordance with the invention can naturally also be understood with regard to the high voltage cable harness, the high voltage system and the method in accordance with the invention—and conversely.

In addition, reference is made to the fact that terms such as "including", "comprising" or "having" do not exclude other features or steps. Moreover, the terms "a" or "the" that refer to a single number of steps or features do not exclude multiple features or steps—and conversely.

One exemplary embodiment of the invention is explained in detail below with reference to the accompanying drawings.

SUMMARY

A principal aspect of the present invention is an electrical plug connector, in particular an electrical multi-pin connector for the electronic power system in the automotive industry, having a plug connector body for receiving a contact device and having a shield, wherein the plug connector body is embodied so as to be inserted into an opening of a housing part of a housing of an electronic unit, characterized in that the plug connector body is embodied in multiple parts and comprises at least one inner plug connector body and an outer plug connector body that are positioned on opposite-lying sides of the housing part, wherein the inner plug connector body can be fixed independently from the housing part in the housing of the electronic unit and wherein attachment means are provided in order to connect the plug connector bodies to one another in such a manner that the housing part is fixed between the plug connector bodies.

A further aspect of the present invention is an electrical plug connector, characterized in that the attachment means are embodied as screw connections.

A further aspect of the present invention is an electrical plug connector, characterized in that one of the plug connector bodies comprises at least two, preferably four, sockets, preferably threaded sockets, which are arranged in a symmetrical manner around the central axis of the plug connector and the corresponding plug connector body comprises two, preferably four, through-going holes that are arranged in a symmetrical manner around the central axis (A) of the plug connector wherein the attachment means are embodied as connection elements, preferably embodied as threaded bolts, in order to connect the plug connector bodies to one another.

A further aspect of the present invention is an electrical plug connector, characterized in that the shield comprises a cylindrical section and multiple shield tabs that adjoin the cylindrical section.

A further aspect of the present invention is an electrical connector, characterized in that the shield tabs comprise radially protruding contact sites that are positioned in such a manner that the radially protruding contact sites make contact with the housing part in the region of the opening.

A further aspect of the present invention is an electrical plug connector, characterized in that the shield is connected to the inner plug connector body.

A further aspect of the present invention is an electrical plug connector, characterized in that the contact device is received in the inner plug connector body, preferably connected to the inner plug connector body in a positive-locking manner and in particular clipped thereto.

A further aspect of the present invention is an electrical plug connector, characterized in that the contact device comprises at least one, preferably two, four or more, inner conductor parts that are embodied preferably as pin contacts.

A further aspect of the present invention is an electrical plug connector, characterized in that the contact device comprises an HV-interlock for monitoring that the plug connector is correctly connected to an electrical mating plug connector.

A further aspect of the present invention is an electrical plug connector, characterized in that the plug connector body comprises a positioning device in such a manner that the plug connector bodies can only be connected to one another in a defined orientation.

A further aspect of the present invention is an electrical connector, characterized in that the electrical plug connector with an electrical mating plug connector forms a coding device in such a manner that the plug connector and the mating plug connector can only be connected to one another in a defined orientation.

A further aspect of the present invention is an electrical connector, characterized in that the plug connector comprises a guide that is embodied in part in an annular manner and is embodied in order to render it possible to connect the plug connector to a mating plug connector that comprises a 45° dismount facility to a 135° dismount facility, preferably a 90° dismount facility.

A further aspect of the present invention is a high voltage cable harness comprising an electrical plug connector and a pre-fabricated cable having a corresponding electrical mating plug connector.

A still further aspect of the present invention is a high voltage system, in particular for a motor vehicle, comprises an electrical plug connector, a housing of a high voltage electronic unit, in particular of a high voltage battery, having a housing part to which the electrical plug connector is fixed and having an electrical mating plug connector for connecting to the electrical plug connector.

An even still further aspect of the present invention is a method for attaching an electrical plug connector to a housing part of a housing of an electronic unit, in particular a high voltage battery, characterized in that a contact device that is provided with a shield is inserted into an inner plug connector body of the electrical plug connector, following which the inner plug connector body is positioned and fixed in the housing in such a manner that a housing part of the housing that is provided with an opening can be placed on the inner plug connector body in such a manner that a front part of the inner plug connector body penetrates the opening in the housing part outward from the inner chamber of the housing, wherein the housing part is embodied as a cover of the housing and following this an outer plug connector body that corresponds to the inner plug connector body is placed on an outer face of the housing part and screwed to the inner plug connector body in such a manner that the housing part is fixed between the two plug connector bodies.

These and other aspects of the present invention are disclosed in more detail herein.

BRIEF DESCRIPTIONS OF THE DRAWINGS

The figures illustrate a preferred exemplary embodiment in which individual features of the present invention are represented in combination with one another. The features of the exemplary embodiment are however also workable separately from the other features of the exemplary embodiment and can accordingly be readily combined by a person skilled in the art to form further expedient combinations and sub-combinations.

Like-functioning elements are provided with the same reference numerals in the figures.

DETAILED WRITTEN DESCRIPTION OF THE PREFERRED EMBODIMENTS

This disclosure of the invention is submitted in furtherance of the Constitutional purposes of the U.S. Patent laws "to promote the progress of science and useful arts (Article 1, Section 8).

Figure 1:
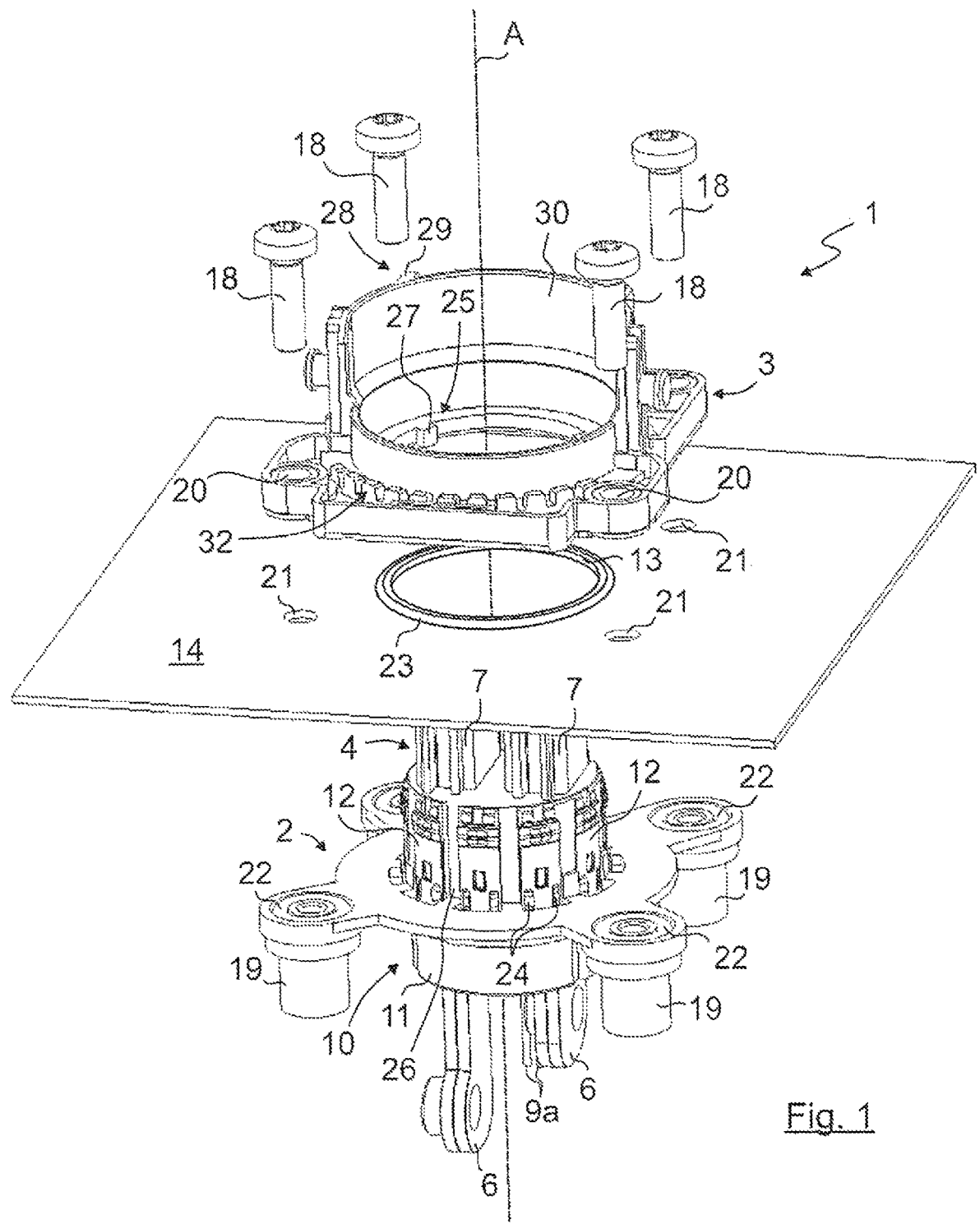
FIG. 1 illustrates an exploded view of the electrical plug connector having an inner plug connector body. a housing part and an outer plug connector body.

Figure FIG. 1 illustrates an electrical plug connector 1 in a preferred embodiment as a multi-pin connector.

The electrical plug connector 1 is suitable, in particular, for use in the electronic power system in the automotive industry or electronics industry. The electrical plug connector 1 in the exemplary embodiment is embodied as a plug connector 1 for the high voltage industry, preferably as a component of a high voltage cable harness, and this is turn, is embodied preferably as a component of a high voltage system.

However, the exemplary embodiment is not to be understood as being limited thereto.

The electrical plug connector 1 comprises a multi-part plug connector body that is assembled in the exemplary embodiment from an inner plug connector body 2 and an outer plug connector body 3.

As is apparent in the figures, the inner plug connector body 2 receives a contact device 4. The contact device 4 can be connected to the inner plug connector body 2 in an arbitrary manner. It is provided in the exemplary embodiment that the contact device 4 is inserted into the inner plug connector body 2 and preferably in particular hooked or clipped therein in a positive-locking manner.

For this purpose, it is provided in the exemplary embodiment that the inner plug connector body 2 comprises latching hooks 5 that hook in or latch in a suitable manner with the contact device 4. (FIG. 5).

It is provided in the exemplary embodiment that current connections 6 (FIG. 5) of the contact device 4 are configured in such a suitable manner that—if the contact device 4 is pushed into the inner plug connector body 2—the latching hooks 5 hook in, or latch with, a corresponding configuration of the current connections 6, for example with a recess or a shoulder, in order to prevent the contact device 4 from being unplugged or removed from the inner plug connector body 2.

Figure 5:
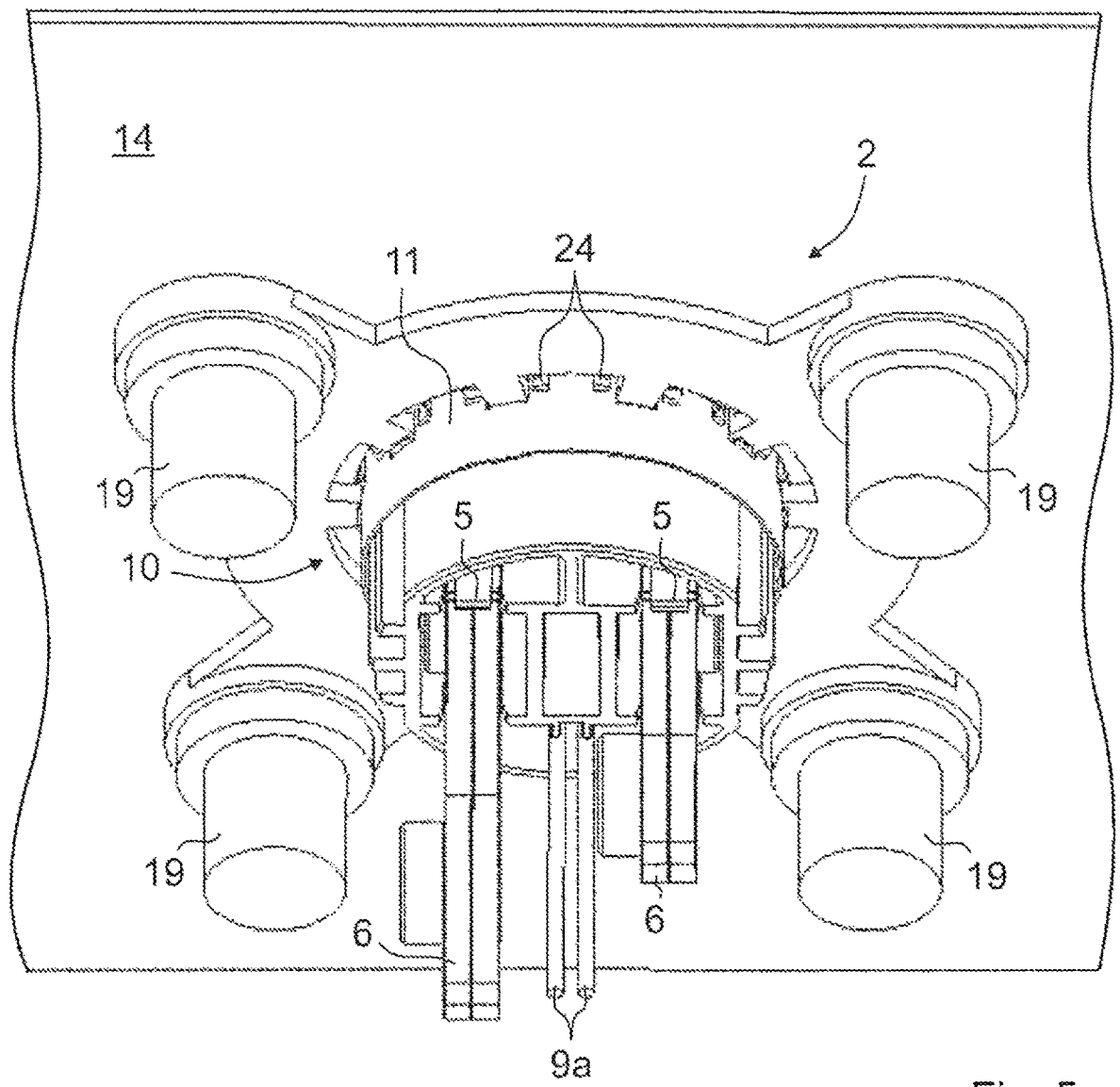
FIG. 5 illustrates a perspective bottom view of the electrical plug connector that is connected to the housing part in accordance with the arrow direction V shown in FIG. 3.

The latching hooks 5 are illustrated schematically in FIG. 5 and are shown hooking in with the current connections 6.

In the exemplary embodiment, four latching hooks 5 are provided, wherein two each latching hooks 5 engage on opposite-lying positions on a respective current connection.

The contact device 4 can be embodied in order to transmit currents and/or data at any frequency and/or data rate. It is provided in the exemplary embodiment that the contact device 4 can be used in the high voltage industry for use with high voltages, in particular 220 Volt, and higher, preferably 400 to 1000 Volt.

For this purpose, the contact device 4 as illustrated in the figures comprises two current connections 6.

Figure 6:
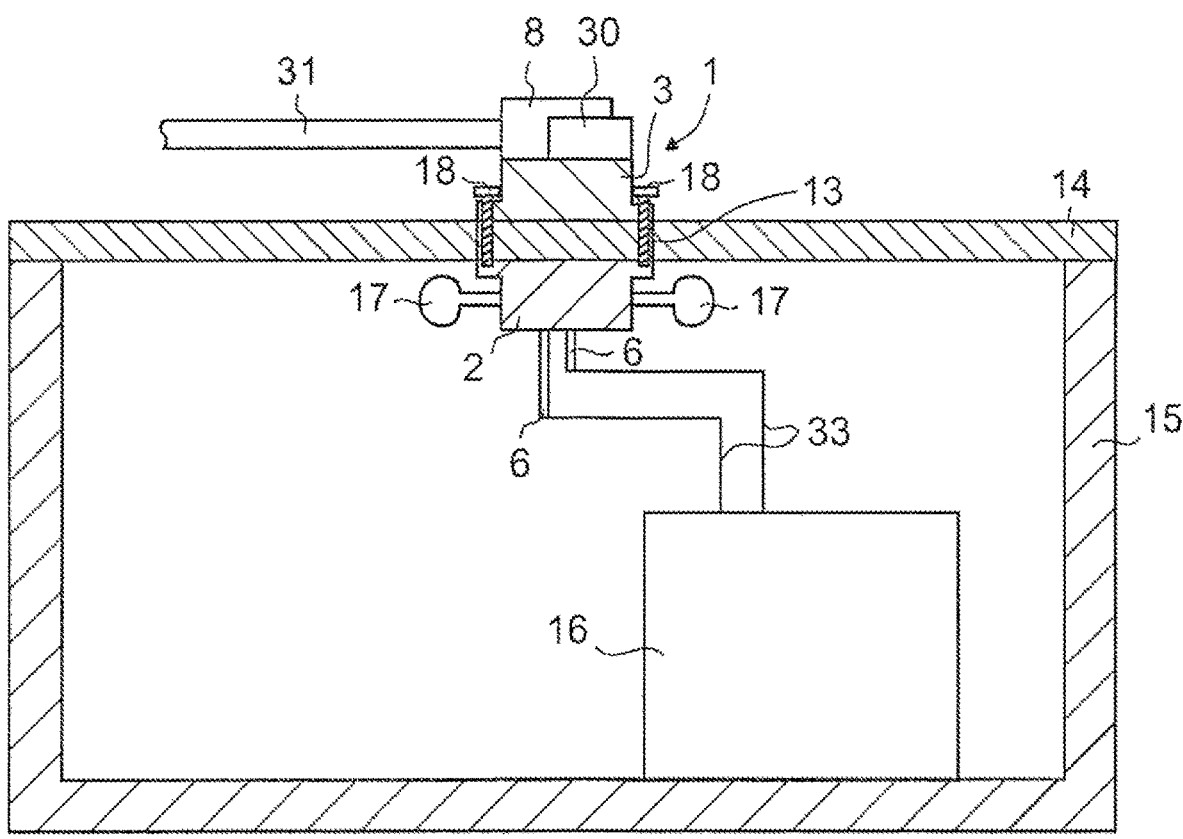
FIG. 6 illustrates a schematic sketch of a high voltage system having a housing of a high voltage electronic unit, in particular of a high voltage battery, and a high voltage cable harness, comprising an electrical plug connector and a pre-fabricated cable having a corresponding electrical mating plug connector.

The current connections 6 are connected in the exemplary embodiment to two inner conductor parts 7 respectively, that are embodied in order to transmit electrical current to accordingly correspondingly embodied inner conductor parts 7 of an electrical mating plug connector 8 that is illustrated schematically in FIG. 6.

It is also possible to provide only one inner conductor part 7 in lieu of two inner conductor parts 7 per current connection 6.

Figure 2:
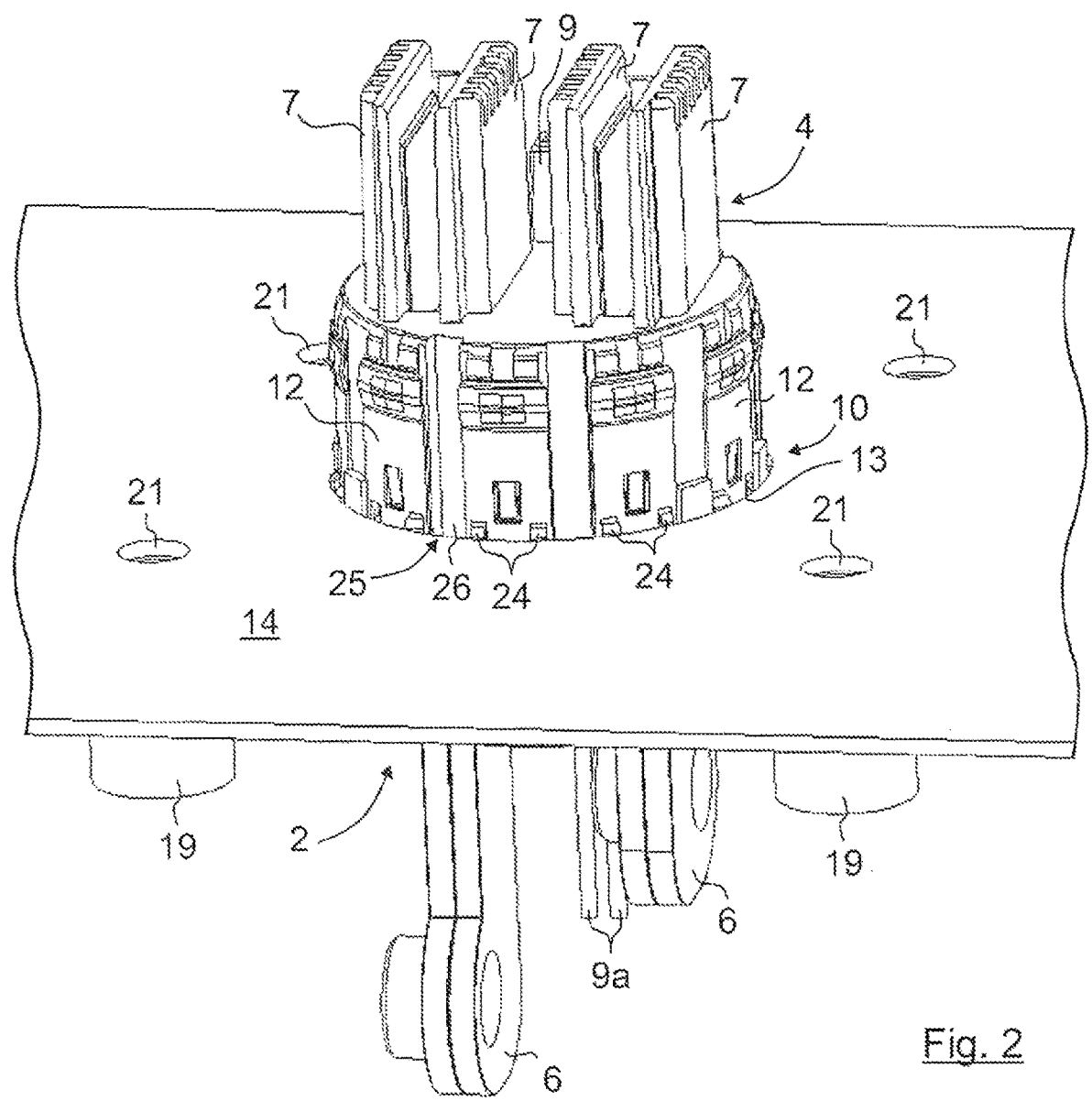
FIG. 2 illustrates a perspective side view of the inner plug connector body that is inserted into an opening of the housing part.
Figure 3:
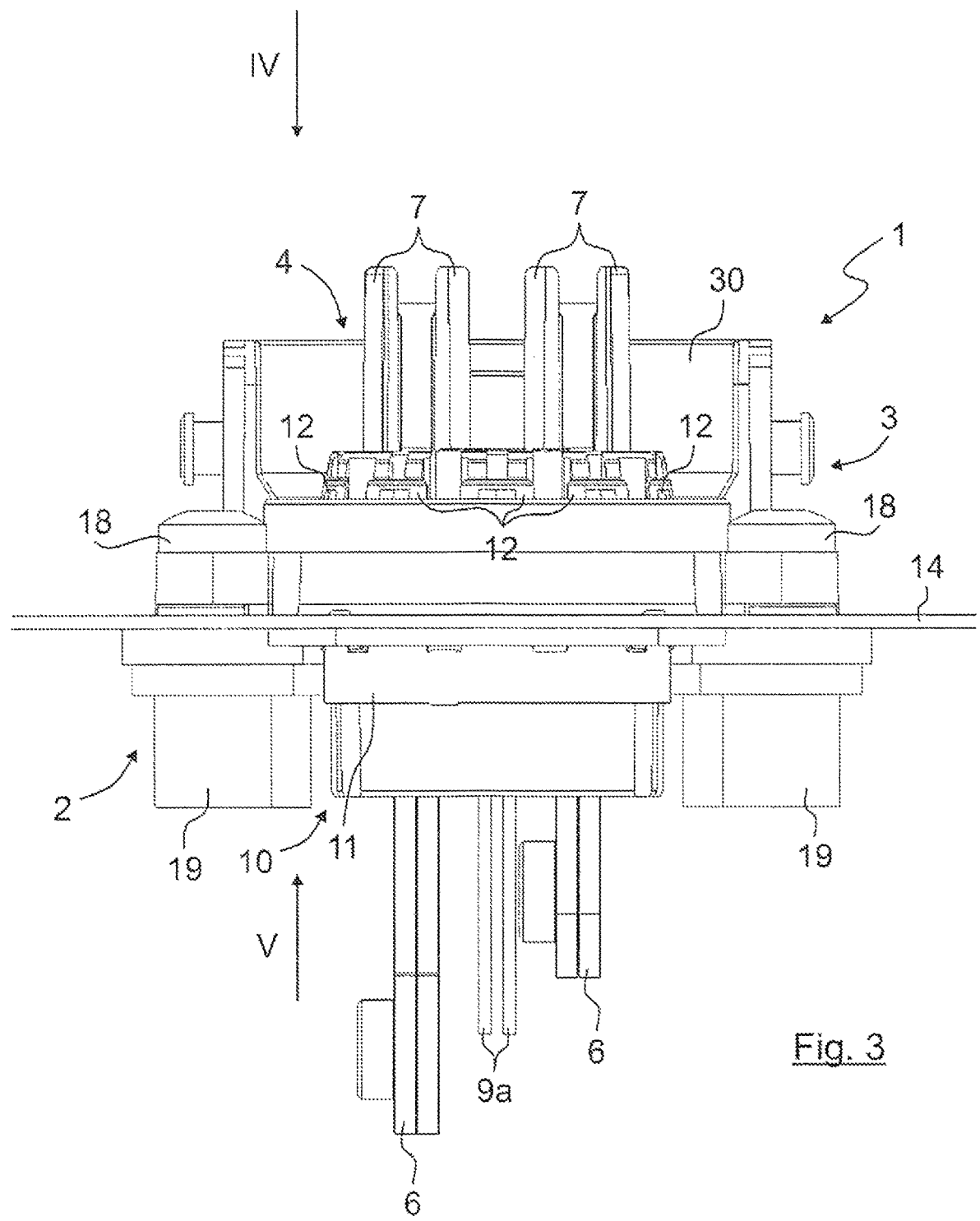
FIG. 3 illustrates an orthographic side view showing the housing part on which the electrical plug connector is fixed.
Figure 4:
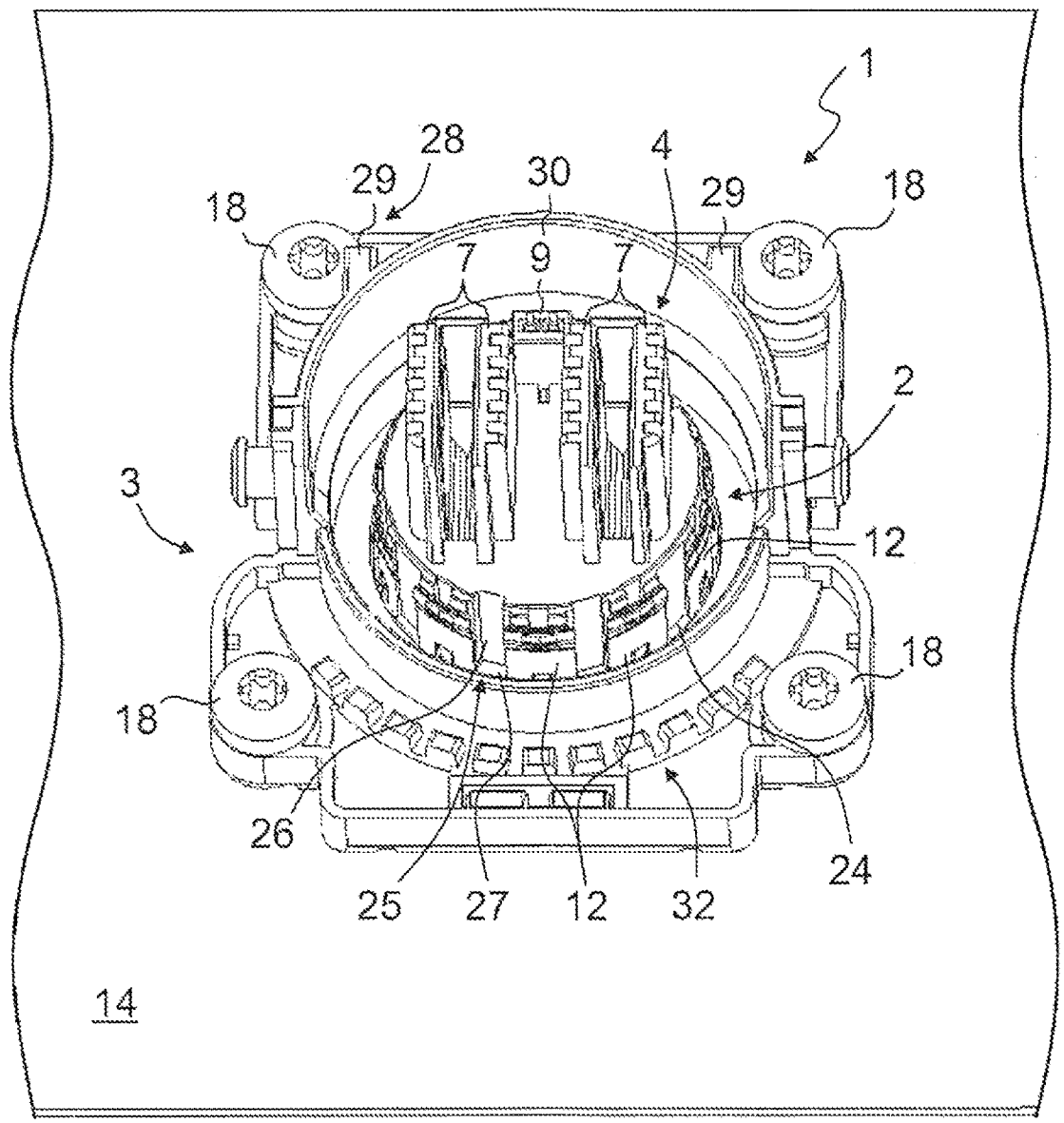
FIG. 4 illustrates a perspective top view of the electrical plug connector that is connected to the housing part in accordance with the arrow direction IV shown in FIG. 3.

As is in particular clearly apparent from FIGS. 2 and 4, it is provided in the exemplary embodiment that in each case two inner conductor parts 7 are arranged in pairs in such a manner that an inner conductor part (not illustrated) of the mating plug connector 8 can be pushed in between one inner conductor pair of the plug connector 1. Alternatively, the inner conductor part of the mating plug connector 8 can also be embodied so as to include the two inner conductor parts 7 of one pair. Moreover, the mating plug connector 8 can also comprise inner conductor parts that are embodied in multiple parts per current connection.

In one embodiment, (not illustrated), it is also possible to provide that the electrical plug connector 1 is embodied in a bipolar manner and consequently includes two contact devices 4.

In the exemplary embodiment, the contact device 4 comprises a circular outer circumference. The shape of the contact device 4 can however be arbitrarily selected, for example only, and not as a limitation, the shape of the contact device 4 can likewise also be square or rectangular. However, a circular outer circumference, in particular also a concentric or symmetrical construction of the contact device 4 has proven to be suitable.

The inner conductor parts 7 of the contact device 4 can preferably be embodied as pin contacts. A configuration of this type has proven to be particularly suitable.

As is particularly apparent in FIG. 4, the contact device 4 can comprise a so-called HV-interlock 9 for monitoring that the electrical plug connector 1 is correctly connected to an electrical mating plug connector 8. FIGS. 1 to 3 and 5 also illustrate two lines 9a that lead to the HV-interlock 9.

The inner plug connector body 2 comprises an electromagnetic shield 10. It is possible, particularly as a result of alternating currents and/or switching procedures of a DC voltage, for electromagnetic interference signals to be generated which can interfere with the electronic system. for example in a motor vehicle, in particular impair the electronic control procedures, such as for example an engine control procedure, in a motor vehicle. The exemplary embodiment illustrates a particularly suitable embodiment of the shield 10. The shield 10 comprises a cylindrical section 11 and multiple shield tabs 12 that adjoin the cylindrical section 11. The mating plug connector 8 is preferably configured in such a manner that it likewise comprises a shield (not illustrated) which contacts the shield tabs 12 at least in part in a radial manner. The shield tabs 12 are preferably embodied in a resilient manner so as to produce a connection to the shield of the mating plug connector 8.

The shield 10 is connected in the exemplary embodiment to the inner plug connector body 2. The inner plug connector body 2 and the shield 10 are jointly inserted into an opening 13 of a housing part 14 of a housing 15 of an electronic unit 16.

The housing 15 can be a component of the electronic unit 16 or can be embodied independently therefrom and receive the electronic unit 16. The electronic unit 16 is embodied in the exemplary embodiment preferably as a high voltage electronic unit, in particular as a high voltage battery 16.

A particularly advantageous connection of the inner plug connector body 2 to the housing 15 or the housing part 14 is produced by virtue of the fact that the inner plug connector body 2 is initially fixed in the housing 15. The fixing procedure can be performed in an arbitrary manner. In the exemplary embodiment, it is illustrated schematically in FIG. 6 that the inner plug connector body 2 is fixed at the screw connection sites 17. The inner plug connector body 2 can be configured accordingly for this purpose (not further illustrated). It is of advantage if the inner plug connector body 2 is initially fixed in the housing 15 and subsequently the housing part 14 that is provided with the opening 13 is placed on or the inner plug connector body 2 is inserted into the opening 13. The inner plug connector body 2 is fixed for this purpose at a correspondingly suitable position in the housing 15 with the result that the opening 13 and the contact device 4 that is inserted into the inner plug connector body 2 are aligned in a concentric manner with one another with the result that the contact device 4 can penetrate the opening 13 outward from an inner chamber of the housing 15.

In the exemplary embodiment it is—optionally—provided that the housing part 14 is embodied as a cover of the housing 15.

If the inner plug connector body 2 is pushed through the opening 13, the outer plug connector body 3 is subsequently lying against an outer face of the housing part 14. This is illustrated in the figures, in particular also in the exploded view in FIG. 1. The outer plug connector body 3 and the inner plug connector body 2 are fixed with the aid of attachment means 18 in such a manner that the housing part 14 is also fixed between the plug connector bodies 2, 3. In the exemplary embodiment, the attachment means are embodied as screw connections, in particular as threaded bolts 18.

In the exemplary embodiment, it is moreover provided that the inner plug connector body 2 comprises at least two, in the exemplary embodiment four, sockets 19 that are arranged in a symmetrical manner about a central axis A of the plug connector 1. The sockets 19 are embodied in the exemplary embodiments as threaded sockets 19. The outer plug connector body 3 comprises correspondingly at least two, in the exemplary embodiment four, through-going holes 20 that are arranged in a symmetrical manner around the central axis A of the plug connector 1.

It is provided in the exemplary embodiment that the housing part 14 comprises holes 21 that align with the threaded sockets 19 or with the through-going holes 20.

Moreover, seals are provided in the exemplary embodiment that are configured as O-rings 22 so as to seal the holes 21 in the housing part 14. It is provided in the exemplary embodiment that the O-rings 22 are placed in the threaded sockets 19. It is preferred that the threaded sockets 19 comprise corresponding depressions for this purpose.

In order to seal the opening 13. a seal 23 is likewise provided in a similar manner. In the exemplary embodiment, a seal 23 is used for this purpose that is positioned between the outer face of the housing part 14 and the outer plug connector body 3 and extends around the opening 13. (only illustrated in FIG. 1).

As is particularly apparent in FIG. 2, the shield tabs 12 and/or alternatively (but not illustrated) the cylindrical section 11 of the shield 10 comprises contact sites 24 that are positioned in such a manner that the contact sites 24 make contact with the housing part 14 in the region of the opening 13. It is preferred that for this purpose the contact sites 24 protrude radially beyond the shield tabs 12. By means of the contact points 24, a reliable electrical connection is produced between the shield 10 and the housing part 14 that is preferably embodied in an electrically conductive manner in particular as a sheet metal part or also as a cast part.

As is particularly apparent in FIG. 1 and FIG. 4, the plug connector bodies 2, 3 comprise a positioning device 25 in such a manner that the plug connector bodies 2, 3 can only be connected to one another in a defined orientation. It is provided in the exemplary embodiment that the positioning device 25 comprises at least one, in the exemplary embodiment multiple, preferably three to four, positioning grooves 26 and positioning lugs 27 that correspond therewith.

In the exemplary embodiment, the positioning grooves 26 are embodied on the inner plug connector body 2 and extend in the axial direction between two shield tabs 12. The outer plug connector body 3 comprises, for this purpose, corresponding positioning lugs 27 that, when the outer plug connector body 3 is correctly placed on the inner plug connector body 2. extend in the axial direction A and can be pushed into the corresponding positioning grooves 26. It is provided in the exemplary embodiment that the plug connector bodies 2, 3 can only be connected to one another in precisely one orientation.

It is provided in the exemplary embodiment that the electrical plug connector 1 with the electrical mating plug connector 8 forms a coding device 28 in such a manner that the plug connector 1 and the mating plug connector 8 can only be connected to one another in a defined orientation. It is provided in the exemplary embodiment that the electrical plug connector 1 and the electrical mating plug connector 8 can only be connected to one another in precisely one orientation.

In the exemplary embodiment. only the part of the coding device 28 is illustrated that is allocated to the electrical plug connector 1, more precisely to the outer plug connector body 3. A coding element 29 of the coding device 28 that is allocated to the outer plug connector body 3 is illustrated in FIG. 1 and FIG. 4 and forms a mechanical coding element. Mechanical coding elements for connecting electrical plug connectors 1 and electrical mating plug connectors 8 to one another are fundamentally known from the prior art. Fundamentally it is possible within the scope of the invention to also provide multiple coding elements 29 on the plug connector 1 and (not illustrated) on the mating plug connector 8 in order to embody the coding device 28 accordingly. In the exemplary embodiment, 2 coding elements 29 are embodied on the outer plug connector body 3.

As is apparent from the figures, the electrical plug connector 1 comprises a guide 30 that is embodied in part in annular manner and is embodied in order to render possible a connection that comprises a 90° dismount facility (as illustrated schematically in FIG. 6) between the plug connector 1 and electrical mating plug connector 8.

In this case, other configurations are also possible, in particular when the mating plug connector 8 comprises a different dismount facility in particular a dismount facility that extends parallel to the central axis A of the plug connector 1 or the central axis A of the plug connector body 2, 3.

As is apparent in the figures, the outer plug connector body 3 comprises a toothing arrangement 32. In the exemplary embodiment, it is provided (not illustrated) that the electrical mating plug connector 8 comprises a corresponding toothing arrangement whereby—after the electrical plug connector 1 has been connected to the electrical mating plug connector 8—a positive-locking connection is produced that offers protection against rotation or can absorb such forces.

FIG. 6 illustrates a schematic construction of a high voltage system having the electrical plug connector 1 and an electrical mating plug connector 8. Also illustrated is the housing 15 that receives the electronic unit 16 which is preferably a high voltage electronic unit, in particular a high voltage battery 16. The high voltage battery 16 is connected to the current connections 6 of the electrical plug connector 1 via lines 33. The housing part 14 is in this case preferably a cover of the housing 15. The electrical mating plug connector 8 is illustrated in FIG. 6 as part of a pre-fabricated cable 31, in other words the pre-fabricated cable 31 comprises the electrical mating plug connector 8. However, it is fundamentally also possible for the electrical mating plug connector 8 to be an electrical mating plug connector 8 that is embodied only as a socket, as an adaptor or the like and in particular it is not absolutely necessary for it to be part of a pre-fabricated cable 31.

OPERATION

Having described the structure of our electrical plug connector 1, high-voltage wiring harness, high-voltage system and method for attaching an electrical plug connector 1, its operation is briefly described.

The present invention provides a method for attaching an electrical plug connector 1 to an electronic unit 16, the method comprising the steps providing a housing 15 of the electronic unit 16, the housing 15 of the electronic unit 16 including a high voltage battery; providing an electrical plug connector 1; providing a contact device 4 that has a shield 10; providing an inner plug connector body 2 of the electrical plug connector 1, and inserting the contact device 4 into the inner plug connector body 2; providing a housing part 14 of the housing 15, and the housing part 14 is embodied as a cover of the housing 15 and the housing part 14 defines an opening 13 to receive at least a portion of the inner plug connector body 2; positioning and fixing the inner plug connector body 2 to the housing part 14 of the housing 15 so that a front part of the inner plug connector body 2 protrudes into and at least partially through the opening 13 defined in the housing part 14 and outward from an inner chamber defined by the housing 15, and providing an outer plug connector body 3 that corresponds to the inner plug connector body 2; axially aligning the outer plug connector body 3 with the inner plug connector body 2 portion that extends though the opening 13 defined in the housing part 15; engaging the outer plug connector body 3 with the inner plug connector body 2 so that the outer plug connector body 3 is on an outer face of the housing part 14 and connecting the inner plug connector body 2 to the outer plug connector body 3 in such a manner that the housing part 14 is fixed between the inner connector body 2 and the outer connector body 3.

A further object of the present invention is an electrical plug connector 1 for an electronic power system in the automotive industry, comprising: a plug connector body 1 for receiving a contact device 4, the plug connector body 1 including an inner plug connector body 2 and an outer plug connector body 3, and the plug connector body 1 is embodied to be inserted into an opening 13 defined in a housing part 14 of a housing 15 of an electronic unit 16; a shield 10 carried by the plug connector body 1; and the inner plug connector body 2 and the outer plug connector body 3 are positioned on opposite-lying sides of the housing part 14, and the inner plug connector body 2 can be fixed in the housing 15 of the electronic unit 16 independently from the housing part 14; and attachment means 18 to connect the inner plug connector body 2 and the outer plug connector body 3 to one another so that the housing part 14 is fixed between the inner plug connector body 2 and the outer plug connector body 3.

A further object of the present invention is an electrical plug connector 1 wherein the attachment means 18 are screw connections.

A further object of the present invention is an electrical plug connector 1 wherein the inner plug connector body 2 or the outer plug connector body 3 defines plural sockets 19, and the defined plural sockets 19 are arranged in a symmetrical manner around a central axis of the plug connector body 1, and the corresponding plug connector body (2, 3) defines a corresponding number of through-going holes 20 that are arranged in a corresponding symmetrical manner around the central axis of the plug connector body 1; and connection elements 18 connect the inner plug connector body 2 and the outer plug connector body 3 to one another.

A further object of the present invention is an electrical plug connector 1 wherein the shield 10 comprises a cylindrical section 11 and multiple shield tabs 12 that adjoin the cylindrical section 11.

A further object of the present invention is an electrical plug connector 1 wherein the multiple shield tabs 12 comprise radially protruding contact sites 24 that are positioned relative to the cylindrical section 11 in such a manner that the radially protruding contact sites 24 contact the housing part 14 proximate the opening 13.

A further object of the present invention is an electrical plug connector 1 wherein the shield 10 is connected to the inner plug connector body 2.

A further object of the present invention is an electrical plug connector 1 wherein the contact device 4 is received in, and is connected to the inner plug connector body 2 in a positive-locking manner.

A further object of the present invention is an electrical plug connector 1 wherein the contact device 4 has plural inner conductor parts 7.

A further object of the present invention is an electrical plug connector 1 and further comprises an HV-interlock 9 carried by the contact device 4; and the HV-interlock 9 monitors that the electrical plug connector 1 is correctly connected to an electrical mating plug connector 8.

A further object of the present invention is an electrical plug connector 1 and further comprises a positioning device 25 carried by the plug connector body 1, and the positioning device 25 ensures the inner plug connector body 2 and the outer plug connector body 3 can only be connected to one another in a defined orientation.

A further object of the present invention is an electrical plug connector 1 and further comprises an electrical mating plug connector 8; and the electrical mating plug connector 8 and the electrical plug connector 1 together form a coding device 28; and the coding device 28 ensures that the plug connector 1 and the mating plug connector 8 can only be connected to one another in a defined orientation.

A further object of the present invention is an electrical plug connector 1 and further comprises a guide 30 carried by the plug connector 1, and the guide 30 is at least partially annular in shape and renders it possible to connect the plug connector 1 to the mating plug connector 8; and the guide 30 includes a dismount facility that is at least partially rotatable.

A further object of the present invention is a high voltage cable harness comprising: an electrical plug connector 1, the electrical plug connector 1 having, a plug connector body 1 for receiving a contact device 4, the plug connector body 1 comprising an inner plug connector body 2 and an outer plug connector body 3, and the plug connector body 1 is embodied to be inserted into an opening 13 defined in a housing part 14 of a housing 15 of an electronic unit 16, a shield 10 carried by the plug connector body 1; and the inner plug connector body 2 and the outer plug connector body 3 are positioned on opposite-lying sides of the housing part 14, and the inner plug connector body 2 can be fixed in the housing 15 of the electronic unit 16 independently from the housing part 14, and attachment means 18 to connect the inner plug connector body 2 and the outer plug connector body 3 to one another in such a manner that the housing part 14 is fixed between the inner plug connector body 2 and the outer plug connector body 3; and a pre-fabricated cable 31 having a corresponding electrical mating plug connector 8.

A further object of the present invention is a high voltage system—for a motor vehicle, comprising an electrical plug connector 1, the electrical plug connector 1 having, a plug connector body 1 for receiving a contact device 4, the plug connector body 1 comprising an inner plug connector body 2 and an outer plug connector body 3, and the plug connector body 1 is embodied to be inserted into an opening 13 defined in a housing part 14 of a housing 15 of an electronic unit 16, a shield 10 carried by the plug connector body 1, and the inner plug connector body 2 and the outer plug connector body 3 are positioned on opposite-lying sides of the housing part 14, and the inner plug connector body 2 can be fixed in the housing 15 of the electronic unit 16 independently from the housing part 14; and attachment means 18 to connect the inner plug connector body 2 and the outer plug connector body 3 to one another in such a manner that the housing part 14 is fixed between the inner plug connector body 2 and the outer plug connector body 3; and a high voltage electronic unit 16 that includes a high voltage battery, and a housing 15 that has a housing part 14; and the electrical plug connector 1 is fixed to the housing part 14; and an electrical mating plug connector 8 for connecting to the electrical plug connector 1.

A still further object of the present invention is an electrical plug connector 1 wherein the plural sockets 19 define threads.

A still further object of the present invention is an electrical plug connector 1 wherein the connection elements 18 are threaded bolts.

An even still further object of the present invention is an electrical plug connector 1 wherein the contact device 4 is received in the inner plug connector body 2 in a clipped positive-locking manner.

An even still further object of the present invention is an electrical plug connector 1 wherein the contact device 4 has plural inner conductor parts 7 that are embodied as pin contacts.

An even still further object of the present invention is an electrical plug connector 1 wherein the electrical plug connection is a multi-pin plug connector.

In compliance with the statute, the present invention has been described in language more or less specific as to the structural and methodical features. It is to be understood, however, that the invention is not limited to the specific features shown and described since the means herein disclosed comprise preferred forms of putting the invention into effect. The invention is therefore claimed, in any of its forms or modifications, within the proper scope of the appended claims appropriately interpreted in accordance with the doctrine of equivalents.

The invention claimed is:

1. An electrical plug connector for an electronic power system in the automotive industry, the electrical plug connector comprising:
   an inner plug connector body that is positionally fixed within a housing of an electronic unit;
   an outer plug connector body that is releasably connectable to the inner plug connector body;
   an electromagnetic shield carried by the inner plug connector body;
   a cover releasably attached to the housing of the electronic unit, the cover defining an opening for the electrical plug connector to extend at least partially therethrough; and wherein
   the inner plug connector body is configured for receiving a contact device; and wherein
   the inner plug connector body is fixed within the housing of the electronic unit independently from the cover; and
   the outer plug connector body and the inner plug connector body are positioned on opposite-lying sides of the cover and are aligned with the opening defined in the cover; and
   attachment means to releasably connect the inner plug connector body and the outer plug connector body to one another.

2. The electrical plug connector as claimed in claim 1 and wherein the attachment means are screw connections.

3. The electrical plug connector as claimed in claim 1 and wherein the inner plug connector body or the outer plug connector body defines plural sockets, and the defined plural sockets are arranged in a symmetrical manner around a central axis of the plug connector body, and the corresponding plug connector body defines a corresponding number of through-going holes that are arranged in a corresponding symmetrical manner around the central axis of the plug connector body; and
   the attachment means connect the inner plug connector body and the outer plug connector body to one another.

4. The electrical plug connector as claimed in claim 3 and wherein the plural sockets define threads.

5. The electrical plug connector as claimed in claim 3 and wherein the attachment means are threaded fasteners.

6. The electrical plug connector as claimed in claim 1 and wherein the electromagnetic shield comprises a cylindrical section and multiple shield tabs that adjoin the cylindrical section.

7. The electrical plug connector as claimed in claim 6 and wherein the multiple shield tabs comprise radially protruding contact sites that are positioned relative to the cylindrical section in such a manner that the radially protruding contact sites contact the cover proximate the opening defined in the cover.

8. The electrical plug connector as claimed in claim 1 and wherein the shield is connected to the inner plug connector body.

9. The electrical plug connector as claimed in claim 1 and wherein the contact device is received in and is connected to the inner plug connector body in a positive-locking manner.

10. The electrical plug connector as claimed in claim 1 and wherein the contact device has plural inner conductor parts.

11. The electrical plug connector as claimed in claim 1 and further comprising:
    an HV-interlock carried by the contact device; and
    the HV-interlock monitors that the electrical plug connector is correctly connected to an electrical mating plug connector.

12. The electrical plug connector as claimed in claim 1 and further comprising:
    a positioning device carried by the electrical plug connector, and the positioning device ensures the inner plug connector body and the outer plug connector body can only be connected to one another in a defined orientation.

13. The electrical plug connector as claimed in claim 1 and further comprising:
an electrical mating plug connector; and
the electrical mating plug connector and the electrical plug connector together form a coding device; and
the coding device ensures that the electrical plug connector and the electrical mating plug connector can only be connected to one another in a defined orientation.

14. The electrical plug connector as claimed in claim 13 and further comprising:
a guide carried by the electrical plug connector, and the guide is at least partially annular in shape and renders it possible to connect the electrical plug connector to the electrical mating plug connector; and
the guide includes a dismount facility that is at least partially rotatable.

15. The electrical plug connector as claimed in claim 1 and wherein the contact device is received in the inner plug connector body in a clipped positive-locking manner.

16. The electrical plug connector as claimed in claim 1 and wherein the contact device has plural inner conductor parts that are embodied as pin contacts.

17. The electrical plug connector as claimed in claim 1 and wherein the electrical plug connection is a multi-pin plug connector.

18. A high voltage cable harness comprising:
an electrical plug connector, the electrical plug connector having, a plug connector body for receiving a contact device;
the plug connector body comprising an inner plug connector body, and an outer plug connector body; and
the plug connector body is embodied to be inserted into an opening defined in a cover that is releasable attachable to a housing of an electronic unit;
an electromagnetic shield carried by the plug connector body; and
the inner plug connector body and the outer plug connector body are positioned on opposite-lying sides of the cover; and
the inner plug connector body can be fixed in the housing of the electronic unit independently from the cover; and
attachment means to connect the inner plug connector body and the outer plug connector body to one another in such a manner that the cover is fixed between the inner plug connector body and the outer plug connector body; and
a pre-fabricated cable having a corresponding electrical mating plug connector.

19. A high voltage system for a motor vehicle, comprising:
an electrical plug connector, the electrical plug connector having,
a plug connector body for receiving a contact device, the plug connector body comprising an inner plug connector body and an outer plug connector body, and the plug connector body is embodied to be inserted into an opening defined in a cover of a housing of an electronic unit,
an electromagnetic shield carried by the plug connector body, and
the inner plug connector body and the outer plug connector body are positioned on opposite-lying sides of the cover and aligned with the opening defined therein, and
the inner plug connector body is fixed in the housing of the electronic unit independently from the cover; and
attachment means to connect the inner plug connector body and the outer plug connector body to one another in such a manner that the cover is fixed between the inner plug connector body and the outer plug connector body; and
a high voltage electronic unit that includes a high voltage battery, and the high voltage battery is carried within the housing; and
an electrical mating plug connector for connecting to the electrical plug connector.

20. A method for attaching an electrical plug connector to an electronic unit, the method comprising the steps:
providing a housing of the electronic unit, the housing of the electronic unit including a high voltage battery;
providing a cover for the housing of the electronic unit, and the cover defines an opening therein;
providing an electrical plug connector;
providing a contact device that has a shield;
providing an inner plug connector body of the electrical plug connector, and inserting the contact device into the inner plug connector body;
positioning and fixing the inner plug connector body within the housing of the electronic unit;
positioning the cover of the housing of the electronic unit on the housing of the electronic unit so that a front part of the inner plug connector body protrudes into and at least partially through the opening defined in the cover of the housing of the electronic unit housing part and outward from an inner chamber defined by the housing of the electronic unit, and
providing an outer plug connector body that corresponds to the inner plug connector body;
axially aligning the outer plug connector body with the inner plug connector body portion that extends though the opening defined in the cover;
engaging the outer plug connector body with the inner plug connector body so that the outer plug connector body is on an outer face of the cover; and
connecting the inner plug connector body to the outer plug connector body in such a manner that the cover is fixed between the inner connector body and the outer connector body.

\* \* \* \* \*